Sept. 24, 1929.  M. N. RIDLEY  1,729,310
VEHICLE FOR USE ON ROADS OR RAILWAYS
Filed April 30, 1926   3 Sheets-Sheet 1
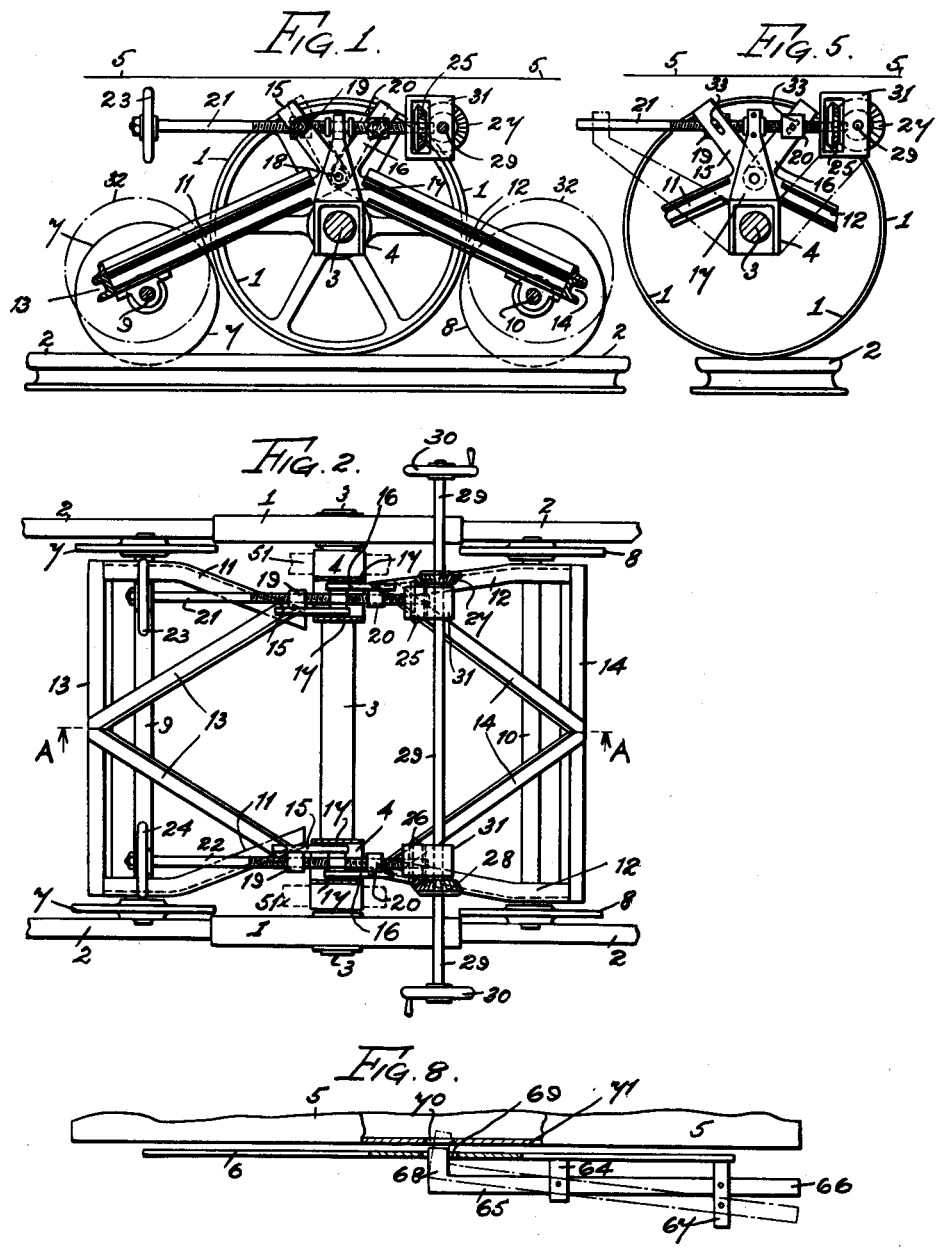

Sept. 24, 1929.  M. N. RIDLEY  1,729,310
VEHICLE FOR USE ON ROADS OR RAILWAYS
Filed April 30, 1926  3 Sheets-Sheet 2
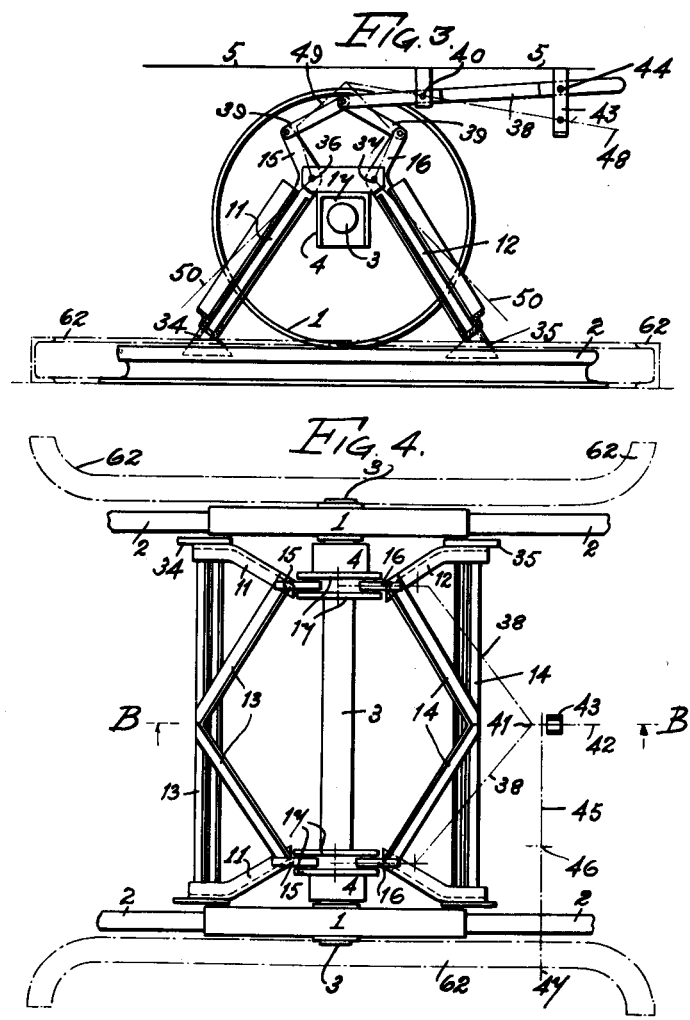

Sept. 24, 1929.   M. N. RIDLEY   1,729,310
VEHICLE FOR USE ON ROADS OR RAILWAYS
Filed April 30, 1926   3 Sheets-Sheet 3
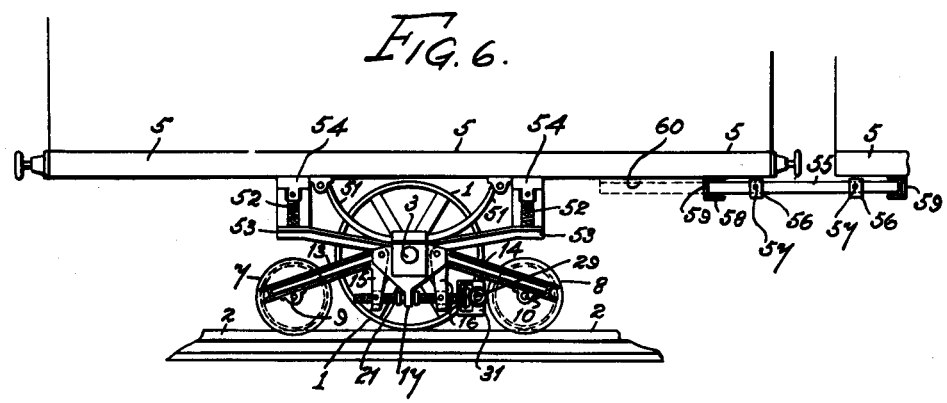
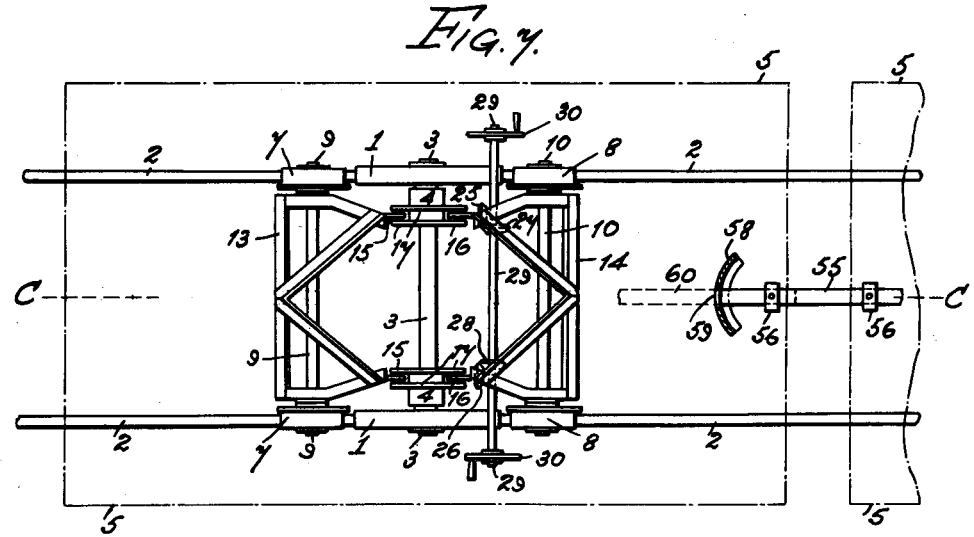

Patented Sept. 24, 1929

1,729,310

UNITED STATES PATENT OFFICE

MARTYN NOEL RIDLEY, OF LEEDS, ENGLAND

VEHICLE FOR USE ON ROADS OR RAILWAYS

Application filed April 30, 1926, Serial No. 105,800, and in Great Britain May 4, 1925.

This invention relates to improvements in the arrangement of wheels of railway and tramway or road vehicles, such as wagons, trucks, lorries, motor-cars, automobiles, or the like,—all of which are hereinafter termed and included in the term "the vehicle",—in order that the vehicle may be adapted to travel or run upon rails or upon a laid or prepared track, or upon an ordinary macadam or other road at will without changing the body of the vehicle from one set of wheels and trolley to another, and without any transshipment of the goods or break of bulk.

In this invention means are provided for using wheels with plain treads,—hereinafter termed "running wheels",—and in conjunction with which there is or are employed one or more pairs of guide wheels or blocks,—with or without treads, or with or without flanges,—at the front and rear of the running wheels, or at the front or rear only. It is, however, preferred to use two pairs of guide wheels for each running wheel, and both guide wheels may, in some cases, be simultaneously raised and lowered to and from their working position.

When the flanges of the running wheels are dispensed with, the guide wheels that are in the front of a running wheel will be in use when the vehicle runs round a curve, but when the vehicle is travelling in an opposite direction the guide wheels, that were formerly at the rear of the running wheel, will become the acting ones. In travelling round a sharp curve of, say, a railway or tramway track at a great speed there is a tendency for the running wheel to skid, in such cases it is advantageous to have and use the two pairs of guide wheels. Only the off or on side guide wheels, without treads, are in use at one time, the opposite guide wheel can only revolve without friction as it does not touch the track. When treads are not provided on the guide wheels or blocks then no part of the weight of the vehicle can be taken by them.

Means are also provided, in some cases, for raising or lowering the guide wheel or blocks to or from the track; in other cases the raising and lowering mechanism may be dispensed with and the said guide wheels or blocks are then fixed to or upon the axles or the axle boxes.

The framework which carries the running wheels and guide wheels or blocks may be mounted either at or about the centre of the vehicle or at each end thereof, or a frame may be arranged to be placed between, and to support the adjacent end of, two vehicles when arranged end to end. Thus provision is made for articulation at this point.

When the framework carrying the said wheels is arranged in the centre of the vehicle and it is desired to run the latter upon ordinary macadamed or other roads, in order to prevent the vehicle tilting to one end when the guide wheels or blocks are raised clear of the road or track, then a coupling,—such as will be hereinafter described,—is employed for connecting the said vehicle to one or more vehicles and for retaining it in a horizontal position. In other cases when a framework is employed at or near each end of the vehicle, then any ordinary coupling is used; the guide wheels or blocks in this case must have treads.

The said framework is provided with springs of the ordinary or laminated type, and it is preferred, but not absolutely necessary, to arrange the axle boxes on the inside of the wheels, and to mount the springs thereon, instead of arranging the springs and axle boxes outside the wheels as is customary on railways and the like. Provision is thus made for avoiding the disadvantages caused by the springs being on the outside of the running wheels and for obviating the body of the carriage swaying laterally and for reducing to a minimum the tendency of the opposite wheels being lifted or raised from the rails.

It will readily be understood that in frames constructed and arranged in accordance with this invention the guide wheels or blocks may be arranged either at the front of, or the rear of, or both at the front of and rear of a number of coupled wheels with or without flanges.

In the drawings hereunto annexed are shown several ways of carrying the invention into practice, in which—

Fig. 1 is a longitudinal section on line A, A, Fig. 2 showing one arrangement of the invention in which a central pair of running wheels are employed and two pairs of plain guide wheels and means for raising and lowering the latter;

Fig. 2 a plan of Figure 1;

Fig. 3 a longitudinal section on line B, B, Fig. 4 showing an alternative method of raising the guide wheels or blocks, and means for raising and lowering the latter;

Fig. 4 a plan of Figure 3;

Fig. 5 a sectional elevation showing a slightly modified form of guide wheel or block lifting mechanism;

Fig. 6 a longitudinal section on line C, C, Fig. 7;

Fig. 7 a plan of Figure 6;

Fig. 8 a sectional elevation of a method of locking the box-carrying frame to the vehicle;

Fig. 9 a view showing a method of banking up the rail or track.

Like parts in all the views are marked with similar reference numerals.

1, 1 are the running wheels which take the whole or major part of the weight of the vehicle. The running wheels are made either solid or hollow and of metal or wood, or with metal or other tires, but, without flanges or grooves, and they are so placed that they can either run on the top of an ordinary rail 2 or upon a road.

The said running wheels 1, 1 are mounted upon an axle 3 carried by axle boxes 4, 4 which may be fixed either directly to the framework 5 of the vehicle, or to a supplemental framework 6 provided with an upper plate.

The plain running wheels 1 are preferably mounted loosely on the axles 3 and thus provide a means of reducing slipping to a minimum. Furthermore, the vehicle will travel round curves much easier than when the wheels are fixed and when they are provided with flanges. When the wheels have flanges the latter have a tendency to grind on the rails when the vehicle is running on curves. It is, however, not altogether essential for the wheels to be loose on the axles 3 when the vehicle is used on rails only, but it is an advantage for them to be loose when the vehicle is also to be used on a road.

In order to retain the running wheels 1, 1 on their rails or tracks 2, two pairs of guide wheels 7, 7 and 8, 8 are provided and mounted respectively upon axles 9 and 10. The said axles are mounted in bearings provided for their reception in the side members 11, 11, 12, 12 of the frames 13, 14.

As shown at Figs. 1 and 2 the guide wheels 7 and 8 are in the form of discs, a portion of the periphery of which will, when in their working position, be arranged below the level of the rails 2, 2 and any lateral movement of the vehicle taking place will be arrested by the face of one of each pair of wheels 7 or 8 coming in contact with the inner longitudinal edge of each of the rails 2, 2. When guide wheels of this type are employed they do not support any of the weight of the vehicle.

The guide wheels 7 and 8 are shown in Figs. 1 and 2 to be arranged on the insides of the rails 2, 2, and are not constantly in contact therewith, consequently there is little friction caused by their use. Furthermore they have no tendency to mount the rails as their flat vertical surfaces meet the rails on their inner vertical sides; the peripherical edge of the wheels thus do not come in contact with, or ride on the rails.

To each of the side members 11, 11, and 12, 12 is fixed or formed an arm 15, 16. One arm 15 and an arm 16 are arranged to be adjacent and fulcrumed so as to work between a pair of uprights 17, 17 fixed to each axle box, and the side members 11, 12 are carried by the pin or spindle 18 also mounted in the uprights 17.

To lift or lower the arms 15, 16, side members 11, 12 and frames 13, 14, an arrangement is employed consisting of the swivelling blocks 19, 20 respectively carried by the arms 15, 16 and provided with an internal screw thread which respectively mesh with the right and left hand threads formed on the longitudinal screw shafts 21, 22 provided with the hand wheels 23, 24. The said screw shafts are arranged horizontally, as shown at Fig. 1, and at a suitable distance apart, and at the ends of the screw shafts opposite to that on which the hand wheels are mounted are fixed mitre or bevel wheels 25, 26 which respectively mesh with the corresponding wheels 27, and 28 mounted and fixed on a transverse shaft 29. The transverse shaft 29 is provided with a hand wheel 30 at each end and is carried in bearings formed in blocks 31 supported by the ends of the shaft 21 and 22.

It will be readily understood that in order to enable the frames 13, and 14 carrying the guide wheels 7, 7, and 8, 8 to be operated simultaneously, duplicate sets of the screw shafts and parts connected therewith are provided.

When it is required to raise the said guide wheels clear of the rails or tracks 2, 2, the shaft 21 or 22 or the transverse shaft 29 is rotated by its hand wheels, and owing to the said shafts being provided with right and left hand screw threads, the swivelling blocks 19, 20 are drawn inwards or caused to move outwards according to the direction in which the said shafts are turned. In this manner the arms 15, 16 are moved in a corresponding direction and the guide wheels 7 and 8 lifted into the position shown by the dotted lines 32, 32, Fig. 1. The screw shafts also act as a means for retaining the guide wheels in a raised or lowered or intermediate position.

When desired one pair of guide wheels and parts connected therewith may be dispensed with, and when such is done, then a pair of guide wheels and means for lifting them from, or lowering them to, their work are arranged either at the front or rear end of the vehicle.

It will be readily understood that in accordance with this invention the guide wheels or blocks may be arranged either at the front of, or the rear of, or both at the front of and rear of a number of coupled wheels with or without flanges.

In some cases it may be found advisable to attach the guide wheels directly to the framework or chassis of the vehicle, or to the axle 3 of the running wheel and they will then be arranged to run on or within the rails and be guided by them. By this means the running wheels will always be guided on their respective rails and there will be no tendency for them to run off the same. When the guide wheels run on the rails they will be provided with flanges.

The guide wheels are so mounted and aranged that they do not,—except as employed at Figs. 6 and 7, as will be hereinafter described,—as a rule take any portion of the weight of the vehicle. When the guide wheels are in their raised position, then the vehicle can travel by means of the running wheels 1, 1 on a macadamed or other road and when this is done the running wheels only are in use.

When the arrangement just described for raising the guide wheels 7, 7, 8, 8 is employed, the screwed shafts 21, 22 are free to move up and down, and they may or may not be guided by the uprights 17.

If the shafts 21, 22 and parts connected therewith are arranged to be stationary as regards vertical movement, then the arms 15, 16 are each provided with a slot 33 to allow for the movement of the trunnions of the swivelling blocks 19 and 20 as shown at Fig. 5. In this case the bearings 31, 31 may each be supported by a bracket fixed to the axle box 4 and in some cases additional brackets may be provided for supporting the shafts 21 and 22. If desired the slots 33 may be vertical.

It may be convenient to rigidly attach the shaft 3 and parts connected therewith either to a frame or to a vehicle and to dispense with the usual laminated or other springs. When this is done, then the modified mechanism shown in Figs. 3 and 4 may be employed for raising the guide wheels 7, 7, 8, 8. In the said figures blocks or plates 34, 35 are shown in place of the guide wheels but guide wheels may be employed in place thereof. These blocks or plates are inclined at their front and rear in order to enable them to keep their path clear of obstructions such as mud, flints, stones and the like, and they are attached to the frames 13, 14 in any convenient manner, such as by bolts.

When the vehicle is being used on grooved rails such as, for example, tramway rails, this last named point is of importance.

The lifting mechanism according to these figures of the drawings comprise the frames 13 and 14 pivoted respectively at 36 and 37 between the uprights 17, 17 fixed or formed on the upper surface of each axle box 4. The upper ends of the arms 15, 16 are each connected to one end of a lever 38 by means of a pair of links 39, 39.

The lever 38 is pivoted to a bracket 40 fixed to the underside of the vehicle. The said lever 38 is in the form of a frame converging to a point 41 (Fig. 4) where it takes the form of a single bar 42. The bar portion 42 is arranged to pass through a U-shaped guide 43 also fixed to the underside of the vehicle and provided with a number of holes 44, through which a pin is passed for locking the lever 38 in any desired adjusted position. In order that the lever 38 may be operated from a side of the vehicle a lever 45 is pivoted at 46 to the underside of the said vehicle or frame and arranged at or about a right angle to the lever 38. The outer end 47 of the lever 45 is carried to a suitable position for operating purposes. The last named lever may be locked in a desired position by any convenient means.

When the lever 38 is lowered down into the position indicated by the dotted line 48, the links 39 and the arms 15 and 16 are also moved into the dotted positions 49 shown in Figure 3, and the lower ends of the frames 13, 14 are raised into the position shown by the dotted lines 50, 50 whereby the blocks 34 and 35 are raised clear of the rail 2, 2.

In the arrangement shown at Figs. 1, 2, 5 to 7, the springs 51, 51 may be provided and fixed at or about their centres to the axle boxes 4, 4, the upper ends of the springs being attached by any convenient means to the frame of the vehicle 5. The said springs are preferably mounted upon the inner side of the wheels 1, 1 in order to minimize the chances of the vehicle over-turning as a result of the wheels jumping from the tracks.

When the running wheels 1, 1 are mounted, say, at or about the centre of the vehicle, —as shown at Figs. 6 and 7,—and the vehicle is running on rails 2, the guide wheels 7 and 8 will give the required lateral support and may also be arranged to take part of the weight, that is, when the heavier end of the vehicle is not supported in any way by a second vehicle. In this instance the guide wheels 7, 7 and 8, 8 are provided with flanges in order that the tread of the wheel may take a part of the weight and the frames 13 and 14 are inverted so that the screw shafts 21 and 22 and the transverse shaft 29, may be arranged below the axle boxes. In this case the axle boxes are additionally secured to the vehicle framework by the coiled springs 52 fixed at their lower ends to the cantilevers 53, 53 carried by the axle boxes 4, 4. The upper ends of the springs 52, 52 are mounted and fixed in any suitable form of shoe 54 fixed to the underside of the vehicle framework.

When the vehicle is running on rails any suitable form of couplings may be used, such as hooks and chains, or hooks and links, mounted, say, on shafts capable of being operated from one or both ends, or one or both sides, or from the centre of the vehicle by means of say, one or more hand wheels and gearing, or endless chains and sprocket wheels, but these arrangements are not shown in the drawings, as they are of any usual and ordinary construction and will be readily understood without further description.

When the vehicle runs on a macadamed or other road an additional coupling is required as no support is then given by the guide wheels 7 and 8 to the said vehicles, said wheels having then been raised clear of the road.

A suitable form of coupling for use in the latter case is arranged as follows:—

A beam 55 made of timber, or steel or other material of any suitable size and length is provided. At each end of the vehicle is pivotably carried under the end of the framing 5, a holder or support 56 through which the beam is passed, and retained in the desired position by a cotter pin 57 which passes through the supports 56 and the beam 55.

The said beam extends beyond the support 56 towards the centre of the vehicle and at the inner end of the beam another support 58 of channel shape is provided, which in plan is bent to a circular arc, the centre of such arc, being the pivoted support mentioned above. When the vehicle goes round a curve the end of the beam will work in the curved support 58. The other end of the beam is fixed in the same manner to the adjacent vehicle. A slot or other hole 59 is made in the curved support 58 at its centre so that the beam when not in use can be pushed backwards through the said hole into the position shown by dotted lines 60, (Fig. 6), and the other end of the beam is allowed to rest in the end support 56, and be cottered or pinned to it. The beam will then be clear of the usual, or other vehicle couplings, but when the beam connection is in use the ordinary chain couplings may be hung upon hooks or other means of support provided at one or both ends of the vehicle, or the chains may be otherwise secured together so as to be clear of the road.

The vehicle can be uncoupled on the road or other suitable place by lowering the guide wheels till they rest on the ground. The vehicle will then have the necessary support.

In some cases, the box-carrying frames and their wheels arranged as hereinbefore described, may be used as supports between two carriages or other vehicles, as for example, in, say, a train of railway vehicles between the adjacent ends of each pair of vehicles a box-carrying frame is attached by pivot pins. The pivot pins are secured in any suitable position on the box-carrying frame that will permit of each vehicle being capable of an independent action when negotiating a curve. This arrangement permits of, say, a train of four vehicles being mounted on five box-carrying frames and their wheels.

To enable the vehicle to pass more easily from the road to the rail, the ground is made up to, about the level of the rails,—as shown at Fig. 9,—a groove 61 being provided on the inside of the rails 2, 2 for the guide wheels 7, 8.

On the outside of each of the rails 2, 2 a metal or other kerb or guide 62,—Figs. 3 and 4,—is provided and they are raised about half an inch above the rails. These said kerbs guide the running wheels on to the rails 2, 2. The guide wheels 7, 8, or blocks 34, 35 can then be readily dropped on to the rails and their flanges,—when used,—into the first mentioned grooves.

When the vehicle is not intended to be used on the road, then the frames carrying the guide wheels may be fixtures, and the screw shafts 21, 22 and the parts connected therewith may be dispensed with.

When the vehicle is used on a macadam or like road it is generally necessary to lock one of the box-carrying frames 6 in a suitable position, or to provide suitable and convenient steering mechanism for operating them. The locking or steering mechanism may be of any suitable and convenient type.

An alternative and simple means for locking the box-carrying frames to the framework of the vehicle is shown in Fig. 8. To the upper plate of each frame is fixed a bracket 64 to which is pivoted an approximately L-shaped lever 65. The end 66 of the said lever works in a guide to which it is secured by means of a cotter or like pin when in its adjusted position. The upturned end 68 of the lever 65 passes through an opening 69 in the upper plate of the frame and is, when in its lowest position, clear of the vehicle frame 5. When it is desired to lock the box frame to the vehicle, the end 66 of the lever 65 is depressed and the end 68 consequently raised. This end of the lever then passes through a hole or opening 70 in a plate 71 fixed to, or forming part of, the vehicle frame 5. The lever now assumes the position indicated by the dotted lines 72 and the box frame 6 is securely locked to the vehicle frame 5.

In the above described arrangement provision is made for one or more pairs of guide wheels being mounted upon arms or levers which are either fixed or pivoted to the axles or the axle boxes, or to box-carrying frames attached to the framework of the vehicle. The arrangement of fixed arms or levers can be applied, say, to locomotives having a number of pairs of running wheels coupled together, and some of the said wheels may have flanges and the others plain treads, or all the running wheels may be provided with flanges; pairs of guide wheels or blocks being placed at the front and rear of the first and last or any of the running wheels. When the said arms or levers are a fixture, then no raising or lowering mechanism is required. In cases where the said arms or levers are pivoted or jointed to, say, the axles or their boxes for raising or lowering the guide wheels or blocks the screw shafts of the raising or lowering mechanism will oscillate or change their horizontal positions with the rise and fall of the guide wheels.

No claim is herein made to the specific embodiment of the invention illustrated in Figures 6 and 7, as the same forms the subject-matter of a divisional application Serial No. 273,646.

What I claim is:—

1. The combination with a vehicle, of a supporting frame, traction means composed of a number of running wheels having plain treads and arranged in pairs, axles on which the pairs of wheels are mounted, boxes secured to the said frame for the reception of the axles, and means for guiding the said running wheels without affecting the pressure of load on the frame to the surfaces on which the running wheels travel.

2. The combination with a vehicle, of a supporting frame, traction means composed of a number of running wheels arranged in pairs and having plain treads, axles on which the pairs of wheels are mounted, boxes carried by the said frame for the reception of the axles, a number of pivotal frames, a pair of guide wheels arranged in front of, and at the rear of, each running wheel adapted to guide the vehicle without affecting the pressure of the load on the surfaces on which the runing wheels bear, and arms for carrying the said guide wheels.

3. The combination with a vehicle, of a supporting frame, traction means composed of a number of running wheels arranged in pairs and having plain treads, axles on which the pairs of wheels are mounted, boxes carried by the said frame for the reception of the axles, a number of pivotal frames, a pair of guide wheels supported by said pivotal frames and, respectively, arranged in front of, and at the rear of, each running wheel, said guide wheels bearing no part of the load of the vehicle, and means for raising and lowering said frames and their guide wheels for the purpose described.

4. The combination with a vehicle of a supporting frame, running wheels with plain treads arranged in pairs, axles upon which the pairs of wheels are mounted, boxes carried by the said framework, frames pivoted to the axle boxes, guides carried by said frames, and adapted to guide the vehicle without bearing any part of the load thereof, and mechanism for operating said frames and guides to move the latter vertically.

5. The combination with a vehicle of a supporting frame, running wheels with plain treads arranged in pairs, axles upon which the pairs of wheels are mounted, boxes carried by the said framework, frames fixed to the axle boxes, guide wheels carried by said frames, and adapted to guide the vehicle without bearing any portion of the load thereof, and mechanism for operating said frames and guide wheels to move the latter relative to the horizontal plane of the axis.

6. The combination with a vehicle of a supporting frame, running wheels with plain treads arranged in pairs, axles upon which the pairs of wheels are mounted, boxes carried by the said framework, frames pivoted to the axle boxes, said frames being arranged at the front of the running wheels, guide wheels carried by said frames and guiding the vehicle without bearing any part of the load thereof, and mechanism for operating said frames and guide wheels to vary the position of said wheels vertically.

7. The combination with a vehicle of a supporting frame, running wheels with plain treads arranged in pairs, axles upon which the pairs of wheels are mounted, boxes carried by the said framework, frames pivoted to the axle boxes, and arranged at the rear of the running wheels, guide wheels carried by said pivoted frames, and constantly out of peripheral contact with the rails on which the running wheels bear, and mechanism for operating said guide wheel frames vertically.

8. The combination with a vehicle of a supporting frame, running wheels with plain treads arranged in pairs, axles upon which the pairs of wheels are mounted, boxes carried by the said framework, frames pivoted to the axle boxes, both at the front and rear of the running wheels, guide wheels carried by said pivoted frames, and constantly out of peripheral contact with the rails on which the running wheels bear, and mechanism for actuating the pivoted frames to move the guide wheels vertically.

9. The combination with a vehicle, of a supporting frame, traction means composed of a number of running wheels arranged in pairs and having plain treads, axles on which the pairs of wheels are mounted, boxes for the reception of the axles, a number of frames having guiding means attached thereto, means for operating said frames comprising screw shafts and gear wheels, said screw shafts being operable from either side of the vehicle.

10. The combination with a vehicle of a supporting frame, traction means composed of a number of running wheels arranged in pairs, axles on which the pairs of wheels are mounted, boxes for the reception of the axles, a number of frames adjustably connected to the supporting frame and having guiding means attached thereto and arranged to be constantly out of peripheral contact with the rails on which the running wheels bear, and means for adjusting the last said frames from the sides of the vehicle.

11. The combination with a vehicle of a supporting frame, running wheels with plain treads arranged in pairs, axles upon which the pairs of wheels are mounted, supplemental frames, boxes carried by the said supplemental frames, means for locking said box-carrying frames to the supporting frame, guide wheel frames pivoted to the axle boxes, guide wheels carried by the last said frames and constantly out of contact with the upper surface of the rails on which the running wheels bear, and mechanism for operating said frames and guide wheels to raise or lower the guide wheels.

MARTYN NOEL RIDLEY.